United States Patent
Morduchowitz

[11] 4,022,590
[45] May 10, 1977

[54] LOW POUR WAXY RESIDUAL FUEL OILS

[75] Inventors: Abraham Morduchowitz, Monsey; Jerzy Jozef Bialy, LaGrangeville, both of N.Y.

[73] Assignee: Texaco Inc., New York, N.Y.

[22] Filed: Feb. 5, 1975

[21] Appl. No.: 547,315

[52] U.S. Cl. .................................................. 44/80
[51] Int. Cl.² ........................................... C10L 1/18
[58] Field of Search ............... 44/80; 260/683.15 B; 137/13

[56] References Cited
UNITED STATES PATENTS

| | | | |
|---|---|---|---|
| 2,806,072 | 9/1957 | Cohen et al. | 260/683.15 B |
| 3,450,786 | 6/1969 | Clough et al. | 260/683.15 B |
| 3,763,244 | 10/1973 | Shubkin | 260/683.15 B |
| 3,776,247 | 12/1973 | Choufoer et al. | 44/80 |
| 3,780,128 | 12/1973 | Shubkin | 260/683.15 B |
| 3,790,358 | 2/1974 | Rossi et al. | 44/80 |

*Primary Examiner*—Allen B. Curtis
*Assistant Examiner*—Mrs. Y. Harris-Smith
*Attorney, Agent, or Firm*—Thomas H. Whaley; Carl G. Ries; Walter D. Hunter

[57] ABSTRACT

The pour points of residual fuel oil compositions are decreased substantially by incorporating with a waxy residual fuel oil a minor amount of a low molecular weight highly-branched polymer of normal alpha-olefin having from 10 to 16 carbon atoms. The low molecular weight polymers being oil-soluble liquids can be conveniently blended with the residual fuel oil.

8 Claims, No Drawings

LOW POUR WAXY RESIDUAL FUEL OILS

BACKGROUND OF THE INVENTION

1. Field of the Invention

This invention is concerned with improving the pour characteristics of residual fuel oils by incorporating therein certain low molecular weight highly-branched polymers of alpha-olefins. More particularly, the invention relates to improved residual fuel oils containing an effective pour depressant amount of a polymer of a normal (i.e., straight chain) alpha-olefin of from 10 to 16 carbon atoms. In another aspect this invention relates to the low-molecular weight, highly branched alpha-olefin copolymer compositions.

2. Description of the Prior Art

As is well known, residual fuel oils contain quantities of wax and asphaltic compounds which render them viscous and interfere with practical use of such oils. In particular, serious problems are encountered in pumping residual fuel oils to burners in pipe lines, etc. and in making them flow at low temperatures. Other factors to be reckoned with are that these oils behave as non-Newtonian liquids at low temperatures and they exhibit variable solidifying temperature and peculiar hysteresis phenomena, all of which make for difficulties in equipment design.

One approach in making these oils easier to handle has been to subject them to fairly lengthy dewaxing procedures.

Another approach which has been used to bring the viscosity of residual fuel oils to suitable level has been to dilute or "cut" them with a major amount of lighter distillate oils but this is an expensive procedure because of the considerably higher cost of the distillate oils relative to the residual oils.

A number of additives have been suggested and tried with success in lubricating oils and in so-called middle distillates in order to tie in the wax therein and improve flow at low temperatures. Such additives consist either of compounds formed by alkylating benzene or naphthalene derivatives or of copolymers of ethylene-vinyl fatty acid ester of a molecular weight up to 60,000 and containing from 15 to 25% by weight of the vinyl saturated aliphatic monocarboxylic acid ester.

The additive mentioned previously being solids, all suffer from one or more disadvantages. For example, they are difficult to dissolve in the residual fuels and generally they must be added with mixing as a solution in a suitable solvent such as toluene, etc. to the heated residual fuel.

One of the main objects of this invention is to provide oil-soluble copolymer pour depressants which are liquids and therefore easily incorporated into residual fuels.

Another object of the present invention is to improve the pour point characteristics of residual oils without using elaborate dewaxing procedures.

An equally important object of this invention is to provide heating oils and fuel oils having improved pour point characteristics by incorporating therein a small amount of certain highly-branched alpha-olefin copolymers.

SUMMARY OF THE INVENTION

The fuel oil compositions of this invention comprise a blend of a major amount of a residual fuel oil, and a minor amount effective to substantially lower the pour point of the said residual fuel of a highly-branched, low-molecular weight, oil-soluble polymer of a normal alpha-olefin having from about 10 to 16 carbon atoms or a polymer of a mixture of normal alpha-olefins having from about 10 to about 16 carbon atoms. This invention also relates to pour depressant compositions of these same polymers.

DETAILED DESCRIPTION OF THE INVENTION

The highly-branched, oil-soluble, liquid copolymers of normal alpha-olefins having about 10 to about 16 carbon atoms can be prepared by methods well known in the art such as described in U.S. Pat. No. 3,149,178. Such polymers can be readily prepared under relatively mild conditions, i.e., at temperatures between about 50° to 200° C, in the presence of a Friedel-Crafts catalyst, such as aluminum chloride, aluminum bromide, etc. In one preferred procedure incremental addition of the alpha-olefin to a slurry of the catalyst in an inert hydrocarbon such as n-hexane, n-heptane, etc. is practiced.

Any normal alpha-olefin having about 10 to about 16 carbon atoms such as 1-decene, 1-dodecene, 1-tridecene, 1-tetradecene, 1-pentadecene, etc. and mixtures thereof may be employed in preparing the pour depressants of this invention. The olefin starting material can be substantially pure normal mono-olefins, mixtures of these normal olefins and/or paraffins containing substantial amounts of the normal alpha-olefins.

Since these synthetic hydrocarbon oligomers are liquids they can be shipped or stored as 100 percent additives and they require no solvent additions prior to blending them into the fuels. This ease of handling and blending makes the pour depressants of this invention more economical to use when compared to the usual solid additives such as ethylene-vinyl acetate, etc.

High pour, waxy residual fuel oils useful in preparing the fuel oil blends of this invention include residual fuel oils having an API gravity of about 10.0 to about 30.00; a sulfur content of between about 0.10 to about 0.96 weight percent; a SUS viscosity at 122° F of about 150 to about 2,000; a pour point of between about 80 and 110° F; a flash point of between about 300° and 450° F; and a wax content of between about 5 and 20 percent.

The number average molecular weights of the polymers, i.e., oligomers, employed in the process of this invention will vary from about 500 to about 5,000 as determined by the vapor phase osmometry method and preferably will be from about 800 to about 1,500. Only a minor amount of the liquid, oil-soluble pour depressant polymer need be incorporated in the residual fuel to substantially reduce the pour point however, generally, from about 0.030 to about 0.50 weight percent of the liquid, highly branched alpha-olefin polymer will be added to the residual oil base to form the fuel oil compositions of this invention.

The physical properties of two waxy, high-pour residual fuel oils suitable for use in preparing the fuel oil blends of this invention are set forth in Table 1 which follows:

TABLE 1

| BASE STOCK INSPECTION TESTS | | |
|---|---|---|
| | BASE STOCK | |
| TEST | Trinidad F-30 Fuel Oil | Fuel Oil A |
| Gravity, API | 24.1 | 29.6 |
| Flash Point | | |

TABLE 1-continued

| | BASE STOCK INSPECTION TESTS | |
|---|---|---|
| | BASE STOCK | |
| TEST | Trinidad F-30 Fuel Oil | Fuel Oil A |
| (PM, °F) | 210 | 303 |
| Viscosity, SUS at 122° F | 103.2 | 86.0 |
| Viscosity, SUS at 150° F | 70.2 | 55.0 |
| ASTM Pour Point, °F | 80 | 80 |
| Wax Content, Weight Percent | 12.7 | 8.0 |
| Sulfur, Weight Percent | 0.18 | 0.18 |

All pour point determination referred to in this specification were obtained by the method of ASTM D97.

In preparing the novel fuel oil blends of this invention the highly branched, oil-soluble, liquid normal alpha-olefin polymer, i.e., the hydrocarbon oligomer, is added with mixing to the residual fuel at a temperature of about 150° to 250° F and preferably at a temperature of from about 180° to about 200° F.

| Cationically Prepared Alpha-Olefin Oligomer (A) As A Pour Depressant-Flow Improver For Fuel Oils | |
|---|---|
| Materials: | |
| $C_{11}-C_{14}$ Normal Olefins (Analysis (% by wt.) $C_9$ 2.0; $C_{10}$ 13.1; $C_{11}$ 29.2; $C_{12}$ 24.7; $C_{13}$ 20.9; $C_{14}$ 9.6 and $c_{15}$ 0.4) | 150 gm. |
| Aluminum Chloride Anhydrous | 3 gm. |
| Heptane | 150 ml. |

PROCEDURE:

A 1 liter resin flash equipped with dropping funnel $N_2$ purge, condenser, thermometer and mechanical stirrer after being charged with heptane (150 ml.) and aluminum chloride (1.5 g.) was purged with prepurified nitrogen for 15 minutes. The temperature was then raised to 50° C. and alpha-olefin monomer (150 g.) was added slowly over a period of 30 minutes. An additional charge of aluminum chloride (1.5 g.) was added and the resulting exotherm was controlled by application of an ice bath (Temp. rose to 74° C). After 20 minutes heat was applied and the reaction was conducted at 53°–68° C for an additional 2 hours. As a finishing step the reaction mixture was heated an additional hour at 80° C. The product was worked up by washing with water, 5% sodium hydroxide and saturated salt (NaCl) solution. Heptane was removed under aspirator pressure and low boiling material (100° C at 0.4 mm.) was stripped under vacuum to afford 135.2 g. (91% yield) of a clear amber fluid (Oligomer A):

The following physical properties were determined:

| Flash Point, COC, °F | = 545 |
|---|---|
| Vis. at 100° F | = 251.1 cs. |
| Vis. at 210° F | = 27.1 cs. |
| Pour Point, °F | = −45 |
| Molecular Weight | = 963 |

(As determined by vapor phase osmometry)

IR Analysis indicated no unsaturation.

The following example illustrates one embodiment of this invention and is to be considered not limitative.

EXAMPLE I

Blends of Trinidad F-30 Fuel Oil containing 0.05 weight percent of Oligomer A, Additive B (a commercial pour depressant consisting of a 18 weight percent solution of polymers of even-numbered linear (i.e., normal) alpha-olefins in the $C_{18} - C_{50}$ range and 47 weight percent of partially esterified linear alpha-olefin-maleic anhydride copolymers and 35 weight percent of an aromatic distillate) and Additive C (a commercial pour depressant consisting of a solution containing 23 weight percent of polyethylene resins having an average molecular weight of about 400, 44 weight percent of polyesters made from pentaerythritol, behenic and high molecular weight dicarboxylic acid having an average molecular weight of about 2,000 to about 3,000 and 33 weight percent of a light gas oil). The average pour points of the blends were determined and these values are set forth in Table 2.

The data of Table 2 indicates that Oligomer A is a highly valuable pour depressant which when added to a residual fuel oil results in a substantial decrease in pour point. Further, the data indicates that the pour depressance properties of Oligomer A are equal to or better than that of Additives B and C.

TABLE 2

| EVALUATION OF SYNTHETIC OLIGOMER AS A POUR DEPRESSANT | | | | |
|---|---|---|---|---|
| Relative Effectiveness of Pour Point Depressant in No. 6 Fuel Oil (Trinidad F-30 Fuel Oil) | | | | |
| | AVERAGE POUR POINT, °F* | | | |
| Pour Depressant | Oligomer A | Additive B | Additive C | Base Stock |
| Additive Con. Weight Percent | | | | |
| 0.05 | 50, 45 | 50 | 55 | 80 |

Spec. for F-30 (No. 6) fuel oil; Pour Point 60° F or Lower.
*After 1 and 2 weeks' storage at 140° F In another aspect, this invention relates to an improved process for the pipeline transportation of waxy residual fuel oil compositions which comprises introducing into the said pipeline a major amount of a residual fuel oil and a minor amount effective to substantially lower the pour point of the said residual fuel of a highly-branched low-molecular weight, oil-soluble polymer of an alpha olefin having from about 10 to about 16 carbon atoms. Any of the residual fuel oil compositions previously described may be introduced into the pipeline and any of the alpha-olefin polymers as previously defined may be employed in these residual fuel oil composition.

What is claimed is:

1. A low-pour, waxy, residual fuel oil composition comprising a blend of a major amount of a waxy residual fuel oil and about 0.030 to about 0.50 weight percent of a liquid polymer of a normal alpha-olefin having from about 10 to about 16 carbon atoms and having a number average molecular weight of about 500 to about 5,000.

2. The composition of claim 1 wherein the said waxy residual fuel has an API gravity of from 10.0 to about 30.0, a sulfur content of between about 0.10 to about 0.96 weight percent; a SUS viscosity at 122° F of about 150 to about 2000; a pour point of between about 80 and 110° F; a flash point of between about 300° and 450° F and a wax content of between about 5 and 20 percent.

3. The composition of claim 1 wherein the minor amount is from about 0.030 to about 0.50 weight percent.

4. The composition of claim 1 wherein the said normal alpha-olefin is a mixture of $C_{11} - C_{14}$ normal alpha-olefins.

5. In the transportation of waxy residual fuel oils the improvement which comprises introducing into the said pipeline a low-pour, waxy, residual fuel oil composition comprising a blend of a major amount of a waxy residual fuel oil and a minor amount effective to substantially lower the pour point of the said residual fuel of a liquid polymer of normal alpha-olefins having from about 10 to about 16 carbon atoms and having a number average molecular weight of about 500 to about 5000.

6. The method of claim 5 wherein the said waxy residual fuel has an API gravity of from 10 to about 30; a sulfur content of between about 0.10 to about 0.96 weight percent; a SUS viscosity at 122° F of about 150 to about 2,000; a pour point of between about 80 and 110; a flash point of between about 300° and 450° F and a wax content of between about 5 and 20 percent.

7. The composition of claim 5 wherein the minor amount is from about 0.030 to about 0.50 weight percent.

8. The composition of claim 5 wherein the said normal alpha-olefin is a mixture of $C_{11} - C_{14}$ normal alpha-olefins.

* * * * *